United States Patent [19]

Borsheim

[11] 3,740,932

[45] June 26, 1973

[54] AIR PRE-CLEANER

[75] Inventor: Lewis A. Borsheim, Fargo, N. Dak.

[73] Assignee: Ross K. Petersen, Minneapolis, Minn.

[22] Filed: May 10, 1971

[21] Appl. No.: 141,758

[52] U.S. Cl............... 55/394, 55/426, 55/431, 55/457, 55/DIG. 28
[51] Int. Cl............................ B01d 45/12
[58] Field of Search............ 55/DIG. 28, 392–399, 55/424, 426, 428–431, 456–457

[56] References Cited
UNITED STATES PATENTS

| 1,434,562 | 11/1922 | Quam | 55/DIG. 28 |
| 1,530,645 | 3/1925 | Brockway | 55/DIG. 28 |
| 1,539,797 | 5/1925 | Chandler et al. | 55/DIG. 28 |
| 1,743,522 | 1/1930 | Bull | 55/398 X |
| 1,853,838 | 4/1932 | White | 55/DIG. 28 |
| 1,864,201 | 6/1932 | Kegerreis et al. | 55/DIG. 28 |
| 1,934,311 | 11/1933 | Kegerreis et al. | 55/394 |
| 2,193,479 | 3/1940 | Donaldson | 55/429 |
| 3,137,553 | 6/1964 | Billey | 55/DIG. 28 |
| 3,354,621 | 11/1967 | Wilson | 55/337 |
| 3,670,480 | 6/1972 | Petersen | 55/DIG. 28 |

Primary Examiner—Frank W. Lutter
Assistant Examiner—Vincent Gifford
Attorney—Burd, Braddock & Bartz

[57] ABSTRACT

An air pre-cleaner mounted on the air intake pipe of an internal combustion engine and connected to an exhaust aspirator mounted on the engine exhaust pipe. The pre-cleaner has a cylindrical housing having an air inlet for circumferentially directing air and foreign materials to a separation chamber. A plate baffle having a peripheral edge portion spaced from the inside wall of the housing separates a low pressure chamber from the separation chamber. A clean air exit passage, coupled with the air intake pipe of the engine, opens into the center of the separation chamber. The aspirator withdraws air from the low pressure chambers over the top of the baffle whereby air is continuously moved through the housing in a circumferential direction separating foreign materials from the air moving into the air intake pipe of the internal combustion engine.

12 Claims, 6 Drawing Figures

PATENTED JUN 26 1973  3,740,932

INVENTOR.
LEWIS A. BORSHEIM
BY Burd, Braddock & Bartz
ATTORNEYS

INVENTOR.
LEWIS A. BORSHEIM
BY
Burd, Braddock & Barty
ATTORNEYS

AIR PRE-CLEANER

BACKGROUND OF INVENTION

Air pre-cleaners are used on the inlets of air cleaners to prevent coarse or fuzzy solid material, as dirt, chaff, snow, lint and other particulate material from entering the air cleaner. If this material is allowed to enter the air cleaner or the carburetor, it will impair the performance of the engine. An air pre-cleaner on the inlet to an air cleaner will reduce the frequency of service of the air cleaner where extreme dust and dirt conditions are encountered. The pre-cleaner is used to separate the majority of the dust and foreign materials from the incoming air stream thereby increasing the effective dust collection capacity of the air cleaner.

Air cleaners of the centrifugal type have air deflecting structures which provide the air with a spiral motion to separate the dust carried in the air. The cleaned air is drawn into the inlet of an engine. Examples of this structure are shown in U.S. Pat., No. 1,501,144, U.S. Pat. No. 1,743,521 and U.S. Pat. No. 1,906,432. The use of the exhaust to provide a flow of air through a pre-cleaner is shown in U.S. Pat. No. 1,539,797, U.S. Pat. No. 3,137,553 and U.S. Pat. No. 3,354,621.

SUMMARY OF INVENTION

The invention relates to a device for separating foreign particulate materials from fluid, as air, carrying the particulate materials. The device is an air pre-cleaner having a housing divided into a separation chamber or compartment and a low pressure chamber or compartment with a baffle located within the housing. The baffle has an outer peripheral edge portion spaced from the inside wall of the housing forming a restricted throat. The low pressure chamber above the baffle is connected to a means for withdrawing air and foreign materials from the low pressure chamber so that fluid and foreign materials flow through both chambers. As the fluid flows through the separation chamber, it is directed in a circumferential or spiral direction whereby centrifugal force separates the foreign material from the air in the central portion of the separation chamber. The cleaned air flows into an air outlet as the inlet pipe to an internal combustion engine. The air containing the foreign material flows through the throat to the low pressure chamber and out to the means for withdrawing the air from the low pressure chamber.

More specifically, the housing has a continuous upright cylindrical inside wall adjacent both the separation chamber and the low pressure chamber. The fluid inlet passage means is on the bottom of the separation chamber and directs the fluid in a circular and upward direction into the separation chamber. This circular and upward direction is maintained as the fluid flows through the restricted throat between the baffle means and the housing into the low pressure chamber. The restricted throat reduces the pressure in the low pressure chamber and increases the velocity of the fluid moving toward and through the throat. This increases the separating effectiveness of the device. The second outlet opening is tangentially open to the low pressure chamber and thus aids in maintaining the centrifugal motion of the fluid. The clean air is extracted from the separation chamber through an opening in the central section of the separation chamber. The opening is centrally aligned to capture the inner vortex of the clean air formed in this cyclone separator. The tangential exit opening does not create a change in the circular or circumferential movement of the air and entrained particles. This provides for a maximum pressure drop and the greatest separating efficiency of the entrained particles from the air.

IN THE DRAWINGS

Figure 1:
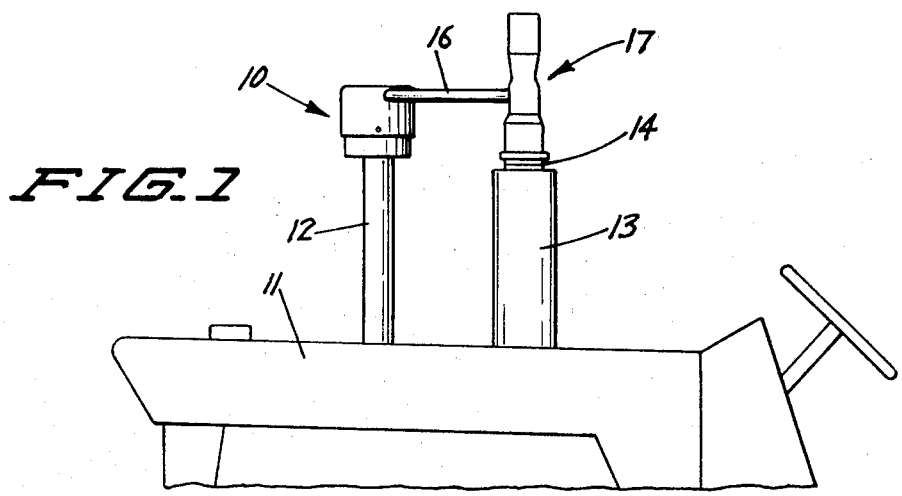
FIG. 1 is a fragmentary elevational view of a tractor equipped with the air pre-cleaner of the invention.

Referring to the drawings, there is shown in FIG. 1 an air cleaner accessory or air pre-cleaner, indicated generally at 10, operatively assembled on a tractor 11 to remove a substantial portion of the foreign materials from the air flowing to the air cleaner connected to the carburetor of the internal combustion engine of the tractor. Tractor 11 has an air intake pipe 12 and an exhaust muffler 13 having a short exhaust pipe 14. The air pre-cleaner 10, mounted on the inlet end of the intake pipe 12, is connected with a flexible tube or rubber hose 16 to an exhaust aspirator, indicated generally at 17, mounted on the exhaust pipe 14. Exhaust aspirator 17 functions as a suction means to continuously withdraw air and foreign materials through the air pre-cleaner in a manner that separates the foreign materials from the air that flows through the air pre-cleaner into the intake pipe 12. The aspirator 17 can be mounted on the exhaust structure of any internal combustion engine to provide a suction means to continuously withdraw fluid and foreign particles from the pre-cleaner.

Figure 2:
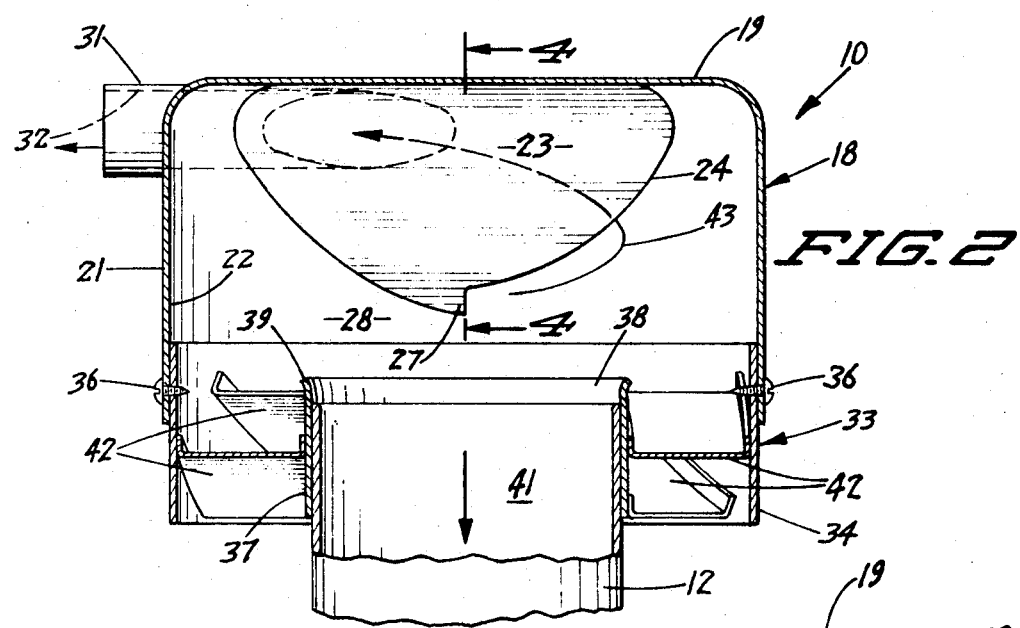
FIG. 2 is an enlarged sectional view of the air pre-cleaner shown in FIG. 1.
Figure 3:
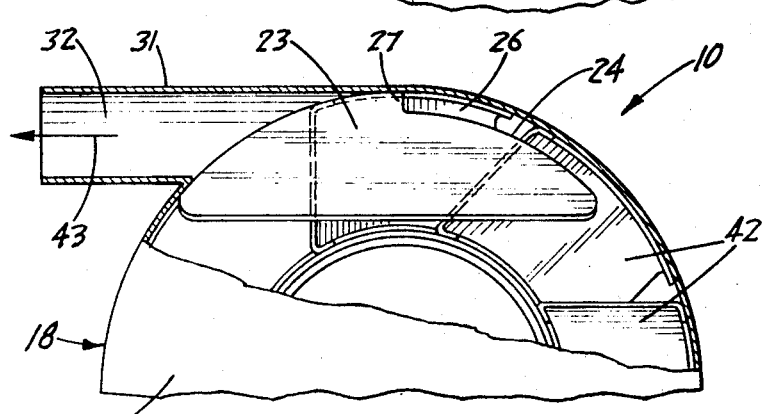
FIG. 3 is a fragmentary top plan view, partly sectioned, of the air pre-cleaner of FIG. 2.
Figure 4:
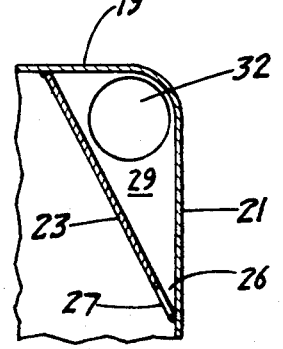
FIG. 4 is a sectional view taken along the line 4—4 of FIG. 2.

Referring to FIG. 2, air pre-cleaner 10 has a generally circular housing, indicated generally at 18, comprising a top wall 19 adjoined to a cylindrical side wall 21. The side wall 21 has a smooth upright cylindrical inside surface 22 of a uniform diameter. Located within housing 18 is a baffle 23 comprising a plate having a forward continuous peripheral edge 24 spaced a uniform distance from a portion of the inside surface 22 to form an uninterrupted throat or space 26. The edge 24 terminates into a downwardly directed lip 27 that extends to the inside surface 22. The plate then follows the cylindrical surface to the top wall 19. The plate, as shown in FIG. 3, follows a generally chordal line along the top wall to the upper edge of the leading peripheral edge 24. The baffle 23 separates the space within the housing 18 into a separation chamber 28 and a low pressure chamber 29. The low pressure chamber 29 is located generally adjacent the upper part of and to one side of the separation chamber 28. The low pressure chamber 29 is above the baffle 23.

Secured to the housing side wall adjacent the low pressure chamber 29 is a fluid exit tube 31 having a passageway 32. The passageway 32 follows a tangential line with respect to the cylindrical inside surface whereby air and particles leaving the low pressure chamber 29 follow a tangential path.

The housing 18 is mounted on a base indicated generally at 33. Base 33 has a generally upright cylindrical sleeve 34 attached to the side wall 21 with a plurality of fasteners 36, as screws, bolts or the like. Located concentrically within the sleeve 34 is a cylindrical central member 37 adjoined to the inlet pipe 12. The cylindrical member 37 has a top mouth 38 surrounded by an outwardly directed annular lip 39. The mouth leads to an axial passageway 41 to direct the clean air into the intake pipe 12. The cylindrical member 37 is attached to the sleeve 34 with a plurality of circumferentially disposed and upwardly inclined vanes or blades 42. Adjacent vanes 42 are spaced from each other to provide spiral passageways or inlet openings. Each vane 42 has a bottom edge located closely adjacent the bottom edge of the member 37 and a top edge located along the top of the member 37. Portions of adjacent vanes are spaced in overlapping positions to prevent axial flow of air through the base 33. The sides of the vanes 42 are secured by rivets, bolts, welds or the like to the sleeve 34 and member 37. The housing 18, baffle 23 and base 33 can be made of metal, plastic or like materials.

On operation of the internal combustion engine, the exhaust gases and air flow through the aspirator 17 which causes a suction or vacuum force in the low pressure chamber 29. The reduction in pressure chamber 29 causes the air to move upwardly in the separation chamber 28 carrying with it the foreign materials in the air, as dust, dirt, snow and other particulate materials. The inlet openings between the vanes 42 initially direct the air entering the separation chamber 28 in a spiral or circumferential pattern as indicated by arrows 43. This circular motion of the air causes a centrifugal separation of the particles of foreign material from the air, moving these particles outwardly toward the inside surface 22. The air in the center area of the chamber 28 is drawn or sucked downwardly through the passageway 41 to the air cleaner and/or carburetor of the engine. The relatively clean air in the center portion of the separation chamber 28 is removed through the member 37 which is open to the lower portion of chamber 28. Passageway 41 is centrally aligned to capture the inner vortex of the clean air formed by this cyclone separator.

The second or fluid outlet passageway 32 is generally tangent with and open to the low pressure chamber 29. The tangential exit passageway 32 does not require a change in the circular motion of the air and entrained particles to be removed from the chamber 29. Since there is no change in the direction of movement of the flowing air and particles, they do not separate or inhibit particulate flow. Also, the continuous centrifugal action on the particles holds the particles entrained in the air, which provides for a maximum pressure drop between the separation chamber 28 and the low pressure chamber 29. The leading edge 24 of the baffle 23 is a continuous configuration and is uniformly spaced from the inside surface 22 to provide an uninterrupted restricted throat between the separation chamber 28 and the low pressure chamber 29. The air moving through the throat increases in velocity and will have greater carryinG capacity of particulate material.

Figure 5:
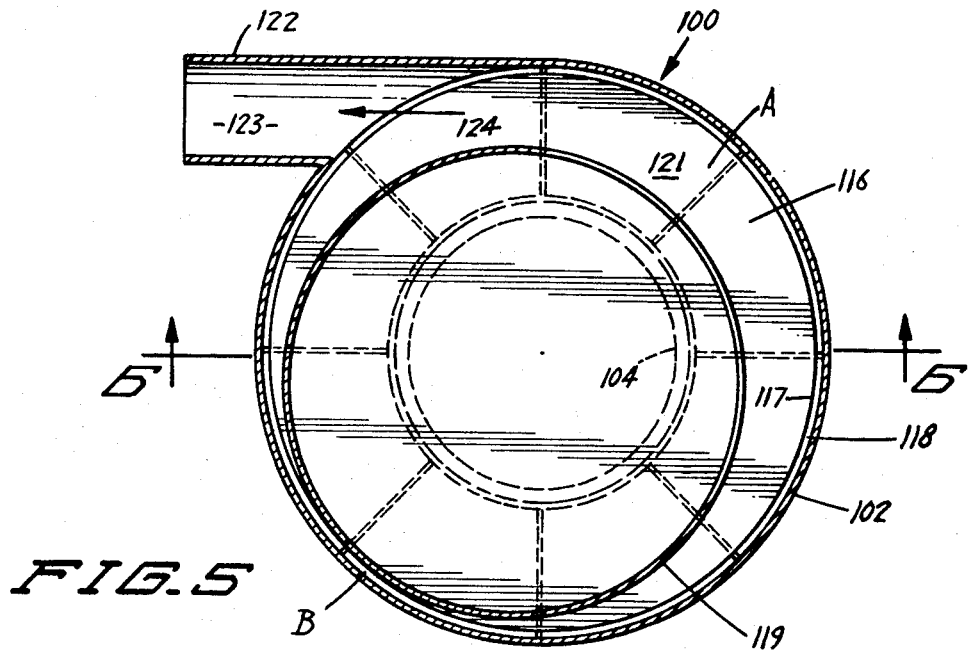
FIG. 5 is a sectional top view taken along line 5—5 of FIG. 6 of a modification of the air pre-cleaner of the invention.
Figure 6:
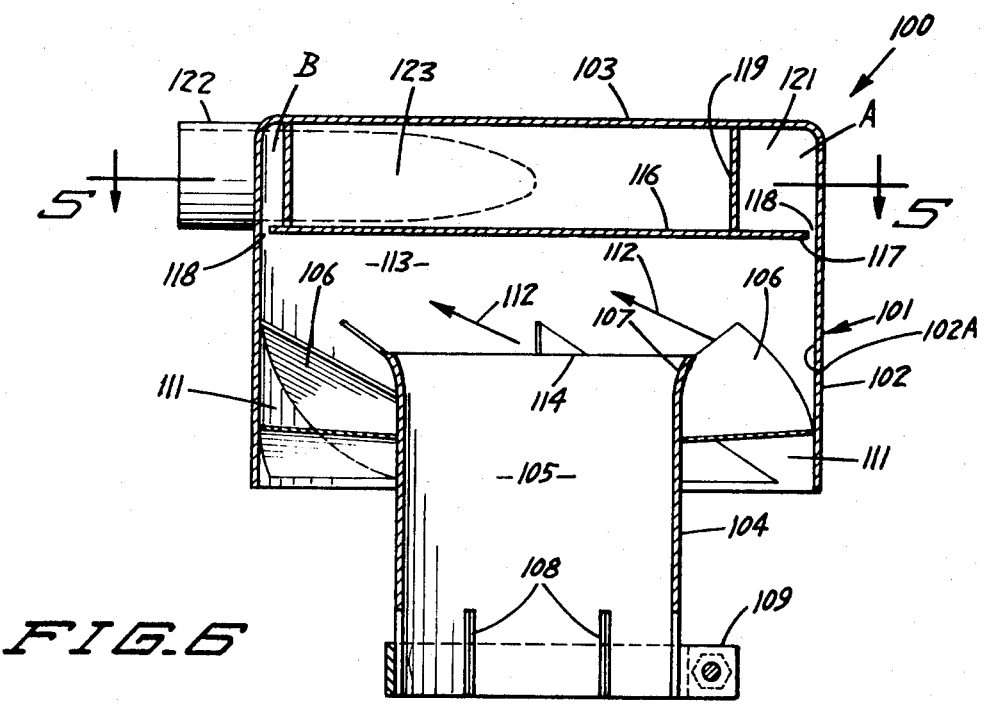
FIG. 6 is a sectional view taken along the line 5—5 of FIG. 5.

Referring to FIGS. 5 and 6, there is shown a modification of the air pre-cleaner of the invention, indicated generally at 100. The pre-cleaner 100 is adapted to be operatively assembled on an air intake member of an internal combustion engine, as a tractor, to remove foreign materials from the air flowing to the carburetor or conventional air cleaner connected to the carburetor. Pre-cleaner 100 has a one-piece inverted cup-shaped housing 101. The housing 101 has a cylindrical upright side wall 102 integrally joined to a flat top wall 103. The inside of wall 102 has a smooth cylindrical surface 102A. Positioned axially within the lower portion of the side wall 102 is an upright cylindrical member or sleeve 104 having an upright passageway 105 open to the inside of the housing. A plurality of spaced inclined vanes or blades 106 attach the sleeve 104 to the housing side wall 102. The upper portion or inlet mouth 107 of the sleeve 104 has an outwardly directed flare which functions to divert incoming air and foreign materials outwardly toward the side wall 102. The lower end of sleeve 104 has circumferentially spaced upright slots 108 which permit the sleeve to be clamped about an air inlet pipe (not shown) leading to the carburetor of an internal combustion engine. A conventional circular clamp 109, positioned about the lower end of the sleeve 104, is operative to fasten the sleeve to the pipe. The entire housing may be made of metal, plastic or like materials.

The vanes 106 are positioned in an overlapped spiral location relative to each other to form upwardly inclined inlet openings 111 between adjacent vanes. The upper edges of each vane 106 are located above the top of the sleeve 104 so that the incoming air and foreign material is directed in a circumferential manner into an unobstructed separation chamber 113. The upper portion of the vanes 106 also are inclined upwardly and outwardly so that the heavier foreign materials are carried outwardly adjacent the inside surface of the side wall 102. This circular action establishes centrifugal forces that carry the heavy foreign particles, as dirt, dust and other particulate matter, outwardly and upwardly toward the top of the housing 101, as shown by arrows 112 in FIG. 5.

Positioned across the top of the separation chamber 113 is a flat baffle 116 comprising a circular plate or disc having an annular uninterrupted peripheral edge portion 117. The annular peripheral edge portion 117 of the disc is spaced a short distance from the side wall 102 providing an annular restriction 118 between the separation chamber 113 and a low pressure chamber 121. A circular ring or support 119, secured to the bottom of the top wall 103, carries the plate 116 and reduces the size of the low pressure chamber. The top of the plate 116 is secured to the bottom of the ring 119. The peripheral portion 117 of the disc is maintained a short distance, approximately ⅛ of an inch, from the inside of the side wall 102.

As shown in FIG. 6, the ring 119 is axially offset with respect to the sleeve 104 and the center of the top wall 103. The low pressure chamber 121 has a large portion, indicated at A, on one side of the ring 119 and a small portion, indicated at B, on the opposite side of the ring. Secured to the upper portion of the side wall 102 is a tangentially directed outlet tube 122 having a tangential passageway 123 open to the large portion A of the low pressure chamber. The outlet tube 122 is adapted to be connected to the aspirator so that air and foreign materials, as indicated by arrow 124, are pulled from the large portion of the low pressure chamber 121. The positioning of the outlet tube 122 in a tangential direction and opening the passageway 123 to the large portion A of the low pressure chamber is instrumental in maintaining the circular motion of the air and foreign materials so that there is a minimum of settling of the foreign materials in the low pressure chamber 121. In addition, this structure creates a more effective low pressure condition, thereby increasing the suction action of the air as it moves through the annular restricted throat 118.

In use, the exhaust gases and air flowing through the exhaust aspirator mounted on an internal combustion engine create a suction force which withdraws air and foreign materials from the low pressure chamber 121. The reduction of pressure in chamber 121 causes air to move upwardly through the separation chamber 113. This moving air carries with it foreign materials that are in the air, as dust, dirt, snow and other particulate materials. As the outside air moves through the inlet openings 111, it is directed in a circumferential or spiral direction into the unobstructed separation chamber 113. This movement of the air causes centrifugal separation of the heavier foreign materials from the air in the center portion of the separation chamber. The clean air in the center of the separation chamber is drawn down into sleeve 104 toward the carburetor. The foreign materials move upwardly along the smooth inside surface of the side walls 102. As they approach the annular restricted opening or throat 118, there is a large suction force caused by a sharp reduction in pressure, on venturi action, which pulls the foreign materials and air into the low pressure chamber 121. The air moving from the large area A of the low pressure chamber continues the circular motion of foreign particles that are tangentially expelled through the passageway 123 into the exhaust aspirator.

In summary, the device is operable to separate foreign particulate materials from fluids, as air, water and the like, by concentrating the particulate materials in a portion of the fluid by using sharp reduction in pressure and centrifugal forces established by spirally moving the fluids. The fluids carrying the materials move outwardly to a restricted throat. The sharp reduction in pressure increases the velocity of the fluids whereby the particulate materials are carried through the throat to an exit passage.

The embodiments of the invention in which an exclusive property or privilege is claimed are defined as follows:

1. A device for separating foreign particulate materials from a fluid comprising: housing means having a continuous upright cylindrical inside surface surrounding a cylindrical separation chamber and a low pressure chamber located generally adjacent the upper portion of the separation chamber; a first means having fluid inlet passage means open to the bottom of said separation chamber for directing fluid in a circular and upward direction into the separation chamber; sleeve means having a first fluid outlet means open to the central section of the separation chamber; a second means having a second fluid outlet passage generally tangentially open to the low pressure chamber; baffle means located in said housing means separating the separation chamber from the low pressure chamber, said baffle means having a continuous outer peripheral edge portion, the entire peripheral edge portion being spaced inward from the inside wall of the housing means to connect the separation chamber with the low pressure chamber with an uninterrupted restricted throat, said baffle means extends downwardly and inwardly toward the inside wall of the housing means, said throat extends downwardly along the inside wall of the housing means, said second fluid outlet passage connectable to suction means to continuously withdraw fluid and foreign particulate materials from the low pressure chamber wherby particulate materials in the fluid flowing through the fluid inlet passage means are separated from the fluid moving to the first fluid outlet means in the separation chamber, said particulate materials moving circumferentially and upwardly along the inside surface of the housing means through the restricted throat into the low pressure chamber and tangentially out of the housing means through the second fluid outlet passage.

2. The device of claim 1 wherein: said baffle means is a plate member located in said housing means to separate the separation chamber from the low pressure chamber, said outer peripheral edge portion of the baffle means being the forward edge of the plate member, said edge spaced from and extended downwardly adjacent said inside surface of the housing.

3. The device of claim 1 wherein: the outer peripheral edge portion of the baffle means is uniformly spaced from the inside wall of the housing means whereby the throat has a generally uniform width.

4. The device of claim 1 wherein: said housing means has a plurality of spaced circumferentially extended vanes located only in the first inlet means to direct the incoming fluid in a circumferential direction around the separation chamber.

5. The device of claim 1 wherein: said housing means has a base, said base having said sleeve means with a passageway comprising the first fluid outlet means and a plurality of spaced circumferentially extended overlapped vanes located only in the first fluid inlet means to direct the incoming fluid in a circumferential direction around the separation chamber.

6. The device of claim 1 wherein: the low pressure chamber is substantially smaller than the separation chamber.

7. A device for separating foreign particulate materials from a fluid comprising: housing means having a continuous upright cylindrical inside surface surrounding a cylindrical separation chamber and a low pressure chamber located generally adjacent the upper portion of the separation chamber; a first means having fluid inlet passage means open to the bottom of said separation chamber for directing fluid in a circular direction and upward direction into the separtion chamber; sleeve means having a first fluid outlet means open to the central section of the separation chamber; second means having a second fluid outlet passage generally tangentially open to the low pressure chamber; baffle means located in said housing means separating the separation chamber from the low pressure chamber, said baffle means having a continuous outer peripheral edge portion, the entire peripheral edge portion being spaced inwardly from the inside wall of the housing means to connect the separation chamber with the low pressure chamber with an uninterrupted restricted throat, said baffle means being a plate member located in said housing means to separate the separation chamber from the low pressure chamber, said outer peripheral edge portion of the baffle means being the forward edge of the plate member, said edge being spaced from and extended downwardly adjacent the inside surface of the housing means.

8. The device of claim 7 wherein: the baffle means is a generally flat plate member.

9. The device of claim 7 wherein: said edge portion of the baffle means is uniformly spaced from the inside surface of the housing whereby said throat has a generally uniform width.

10. The device of claim 7 wherein: the low pressure chamber is substantially smaller than the separation chamber.

11. The device of claim 7 wherein: said housing means has a base, said base having sleeve means with a passageway comprising the first fluid outlet means and a plurality of spaced circumferentially extended overlapped vanes located only in the first fluid inlet means to direct the incoming fluid in a circumferential direction around the separation chamber.

12. The device of claim 7 wherein: said housing means has a plurality of spaced circumferentially extended vanes located only in the first fluid inlet means to direct the incoming fluid in a circumferential direction around the separation chamber.

* * * * *